US008314950B2

(12) United States Patent
Xiao

(10) Patent No.: US 8,314,950 B2
(45) Date of Patent: Nov. 20, 2012

(54) APPROACH FOR USING SETTINGS MISMATCH TOLERANCE LEVELS TO HANDLE MISMATCHES BETWEEN PRINT JOB SETTINGS AND PRINTING DEVICE SETTINGS

(75) Inventor: Zhenning Xiao, Renton, WA (US)

(73) Assignee: Ricoh Company, Ltd., Tokyo (JP)

( * ) Notice: Subject to any disclaimer, the term of this patent is extended or adjusted under 35 U.S.C. 154(b) by 658 days.

(21) Appl. No.: 12/360,049

(22) Filed: Jan. 26, 2009

(65) Prior Publication Data

US 2010/0188680 A1 Jul. 29, 2010

(51) Int. Cl.
*G06K 15/00* (2006.01)
*G06F 3/12* (2006.01)

(52) U.S. Cl. .................... 358/1.13; 358/1.14; 358/1.15; 358/1.18

(58) Field of Classification Search ........................ None
See application file for complete search history.

(56) References Cited

U.S. PATENT DOCUMENTS 5,129,639 A * 7/1992 DeHority .................... 270/1.01
5,467,434 A 11/1995 Hower et al.
6,148,346 A 11/2000 Hanson
6,351,320 B1 2/2002 Shin
6,967,728 B1 11/2005 Vidyanand
2002/0171857 A1 11/2002 Hisatomi et al.
2003/0184782 A1 10/2003 Perkins et al.
2004/0184043 A1* 9/2004 Hirosugi et al. ............... 358/1.1
2005/0046886 A1 3/2005 Ferlitsch
2006/0262337 A1* 11/2006 Kamata et al. ............... 358/1.13
2007/0229880 A1* 10/2007 Harmon et al. .............. 358/1.15

FOREIGN PATENT DOCUMENTS

JP 2005148953 A 6/2005
WO WO 2004/070607 A1 8/2004

OTHER PUBLICATIONS

European Patent Office, "European Search Report", application No. EP 07250298, dated Feb. 23, 2010, 8 pages.
U.S. Appl. No. 11/345,503, filed Jan. 31, 2006, Notice of Allowance, May 24, 2010.

* cited by examiner

*Primary Examiner* — Benny Q Tieu
*Assistant Examiner* — Haris Sabah
(74) *Attorney, Agent, or Firm* — Hickman Palermo Truong Becker Bingham Wong LLP; Edward A. Becker

(57) ABSTRACT

An approach is provided for using settings mismatch tolerance levels to handle mismatches between print job settings and printing device settings. A print driver generates a graphical user interface that allows a user to select a print settings mismatch tolerance level from a plurality of print settings mismatch tolerance levels. The print driver determines whether a mismatch exists between a set of print settings specified for the particular electronic document to be printed and a set of print settings specified for a printing device on which the particular electronic document is to be printed. If a mismatch exists, then the print driver performs one or more actions corresponding to the particular print settings mismatch tolerance level to address the mismatch.

20 Claims, 10 Drawing Sheets

200

| SETTINGS MISMATCH TOLERANCE LEVEL | CORRESPONDING OPERATIONS |
|---|---|
| LOW | 1. Display settings mismatches on GUI<br>2. Allow user to change settings to resolve mismatches<br>3. Printing not allowed until all settings mismatches are resolved |
| MEDIUM | 1. For critical settings:<br>a.) Display settings mismatches on GUI<br>b.) Allow user to change settings to resolve critical settings mismatches<br>c.) Printing not allowed until all critical settings mismatches are resolved<br>2. For non-critical settings:<br>a.) Determine alternative settings values to resolve settings mismatches<br>b.) Allow printing to continue with alternative settings values |
| HIGH | 1. Determine alternative settings values to resolve settings mismatches<br>2. Allow printing to continue with alternative settings values |
| CUSTOM | 1. Determine custom settings values to resolve settings mismatches<br>2. Allow printing to continue with custom settings values |

| SETTINGS MISMATCH TOLERANCE LEVEL | CORRESPONDING OPERATIONS |
|---|---|
| LOW | 1. Display settings mismatches on GUI<br>2. Allow user to change settings to resolve mismatches<br>3. Printing not allowed until all settings mismatches are resolved |
| MEDIUM | 1. For critical settings:<br>a.) Display settings mismatches on GUI<br>b.) Allow user to change settings to resolve critical settings mismatches<br>c.) Printing not allowed until all critical settings mismatches are resolved<br>2. For non-critical settings:<br>a.) Determine alternative settings values to resolve settings mismatches<br>b.) Allow printing to continue with alternative settings values |
| HIGH | 1. Determine alternative settings values to resolve settings mismatches<br>2. Allow printing to continue with alternative settings values |
| CUSTOM | 1. Determine custom settings values to resolve settings mismatches<br>2. Allow printing to continue with custom settings values |

700

APPROACH FOR USING SETTINGS MISMATCH TOLERANCE LEVELS TO HANDLE MISMATCHES BETWEEN PRINT JOB SETTINGS AND PRINTING DEVICE SETTINGS

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

One of the situations that users sometimes encounter when printing electronic documents is mismatches between print job settings and printing device settings. Suppose that a user creates an electronic document using a word processing program and then attempts to print the electronic document using particular print job settings. The user typically selects the particular print job settings using a graphical user interface generated by the word processing program and/or the print driver, depending upon the particular print job settings being selected. Mismatches between the particular print job settings selected by the user and current printing device settings can cause the print job to not be processed. For example, some printers will display an error message indicating that the printer is not currently configured to print the electronic document using the particular print job settings and may allow the user correct the mismatches by taking some action, such as installing a paper tray or loading a particular type of media. Alternatively, the user may instruct the printing device to print the electronic document using the current printing device settings. When encountering a setting mismatch, some printers will automatically print the electronic document using the current printing device settings.

One of the problems that arise from the aforementioned situation is that a given solution does not take into consideration the particular context in which the electronic document is being printed. In a personal computing environment, users may not be concerned about minor mismatches between print job settings and printing device settings. For example, a user may not be concerned about having an electronic document printed on letter size paper or A4 size paper. In commercial production printing environments, however, even minor mismatches between print job settings and printing device settings cannot be tolerated. Based on the foregoing, there is a need for an approach for addressing mismatches between print job settings and printing device settings that does not suffer from limitations of prior approaches.

SUMMARY

An approach is provided for using settings mismatch tolerance levels to handle mismatches between print job settings and printing device settings. A print driver generates a graphical user interface that allows a user to select a print settings mismatch tolerance level from a plurality of print settings mismatch tolerance levels. Example tolerance levels include, without limitation, low, medium, high and custom tolerance levels. The graphical user interface may also allow a user to specify print settings to be used to print a particular electronic document. The print driver determines whether a mismatch exists between a set of print settings specified for the particular electronic document to be printed and a set of print settings specified for a printing device on which the particular electronic document is to be printed. If a mismatch exists between the set of print settings specified for the particular electronic document to be printed and the set of print settings specified for the printing device on which the particular electronic document is to be printed, then the print driver performs one or more actions corresponding to the particular print settings mismatch tolerance level to address the mismatch between the set of print settings specified for the particular electronic document to be printed and the set of print settings specified for the printing device on which the particular electronic document is to be printed. The one or more actions may vary, depending upon a particular implementation. For example, the actions may include requiring a user to resolve mismatches by changing print settings values via the graphical user interface. As another example, the actions may include the print driver determining alternative settings values to be used to resolve the mismatches. As yet another example, actions to be taken to resolve the mismatches may be indicated by configuration data or by a user. For example, a user or an administrator may specify how mismatches are to be resolved. The use of settings mismatch tolerance levels allows users to tailor how settings mismatches are resolved to a particular printing environment. For example, users in commercial or production printing environments may select a low mismatch tolerance level that requires all settings mismatches to be resolved. Users in personal printing environments may select a high mismatch tolerance level that allows mismatches to be resolved by the print driver to provide a balance between document appearance and convenience.

According to one computer-implemented method for managing mismatches between print job settings and printing device settings, a print driver generates a graphical user interface that allows a user to select a print settings mismatch tolerance level from a plurality of print settings mismatch tolerance levels. The print driver detects, via the graphical user interface, a selection of a particular print settings mismatch tolerance level from the plurality of print settings mismatch tolerance levels. The print driver determines whether a mismatch exists between a set of print settings specified for a particular electronic document to be printed and a set of print settings specified for a printing device on which the particular electronic document is to be printed. If a mismatch exists between the set of print settings specified for the particular electronic document to be printed and the set of print settings specified for the printing device on which the particular electronic document is to be printed, then the print driver performs one or more actions corresponding to the particular print settings mismatch tolerance level to address the mismatch between the set of print settings specified for the particular electronic document to be printed and the set of print settings specified for the printing device on which the particular electronic document is to be printed.

BRIEF DESCRIPTION OF THE DRAWINGS

In the figures of the accompanying drawings like reference numerals refer to similar elements.

FIG. 2 is a table that depicts three example settings mismatch tolerance levels and the corresponding operations performed by a print driver.

DETAILED DESCRIPTION

Figure 1:
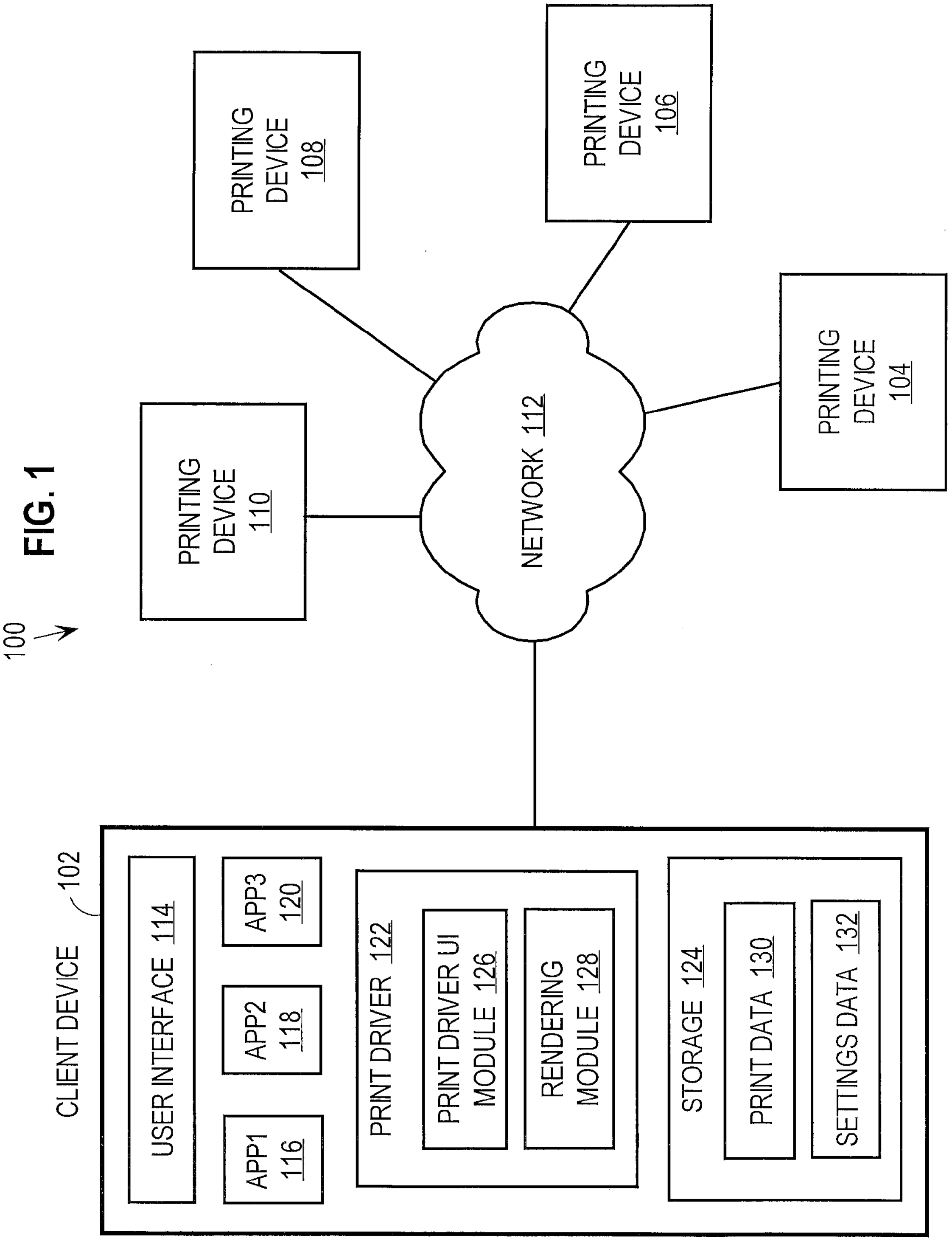
FIG. 1 is a block diagram that depicts an example arrangement in which an approach for handling mismatches between print job settings and printing device settings using tolerance levels.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE FOR USING SETTINGS MISMATCH TOLERANCE LEVELS TO HANDLE MISMATCHES BETWEEN PRINT JOB SETTINGS AND PRINTING DEVICE SETTINGS
III. SETTINGS MISMATCH TOLERANCE LEVELS
A. Low Settings Mismatch Tolerance Level
B. Medium Settings Mismatch Tolerance Level
C. High Settings Mismatch Tolerance Level
D. Custom Settings Mismatch Tolerance Level
IV. WSD IMPLEMENTATIONS
V. IMPLEMENTATION MECHANISMS I. Overview An approach is provided for using settings mismatch tolerance levels to handle mismatches between print job settings and printing device settings. A print driver generates a graphical user interface that allows a user to select a print settings mismatch tolerance level from a plurality of print settings mismatch tolerance levels. Example tolerance levels include, without limitation, low, medium, high and custom tolerance levels. The graphical user interface may also allow a user to specify print settings to be used to print a particular electronic document. The print driver determines whether a mismatch exists between a set of print settings specified for the particular electronic document to be printed and a set of print settings specified for a printing device on which the particular electronic document is to be printed. If a mismatch exists between the set of print settings specified for the particular electronic document to be printed and the set of print settings specified for the printing device on which the particular electronic document is to be printed, then the print driver performs one or more actions corresponding to the particular print settings mismatch tolerance level to address the mismatch between the set of print settings specified for the particular electronic document to be printed and the set of print settings specified for the printing device on which the particular electronic document is to be printed. The one or more actions may vary, depending upon a particular implementation. For example, the actions may include requiring a user to resolve mismatches by changing print settings values via the graphical user interface. As another example, the actions may include the print driver determining alternative settings values to be used to resolve the mismatches. As yet another example, actions to be taken to resolve the mismatches may be indicated by configuration data or by a user. For example, a user or an administrator may specify how mismatches are to be resolved. The use of settings mismatch tolerance levels allows users to tailor how settings mismatches are resolved to a particular printing environment. For example, users in commercial or production printing environments may select a low mismatch tolerance level that requires all settings mismatches to be resolved. Users in personal printing environments may select a high mismatch tolerance level that allows mismatches to be resolved by the print driver to provide a balance between document appearance and convenience.

II. Architecture for Using Settings Mismatch Tolerance Levels to Handle Mismatches Between Print Job Settings and Printing Device Settings FIG. 1 is a block diagram that depicts an example arrangement 100 in which an approach for handling mismatches between print job settings and printing device settings using tolerance levels may be implemented, according to an embodiment of the invention. Arrangement 100 includes a client device 102 and printing devices 104, 106, 108, 110 that are communicatively coupled to each other via a network 112. Network 112 may be implemented by any medium or mechanism that provides for the exchange of data between the various elements depicts in FIG. 1. Examples of network 112 include, without limitation, a network such as a Local Area Network (LAN), Wide Area Network (WAN), Ethernet or the Internet, or one or more terrestrial, satellite or wireless links. Network 112 may also provide secure communications between the various elements depicted in FIG. 1. The various elements depicted in FIG. 1 may also communicate with each other via one or more direct communications links that are not depicted in FIG. 1 or described herein for purposes of brevity.

Client device 102 may be any type of client device and the invention is not limited to any particular type of client device. Examples of client device 102 include, without limitation, a desktop computer, a laptop computer, a personal digital assistant (PDA), a mobile device and a telephony device. In the present example, client device 102 includes a user interface 114, applications APP1 116, APP2 118 and APP3 120, a print driver 122 and storage 124.

Printing devices 104, 106, 108, 110 may be any type of device that is capable of processing print data and generating a printed version of an electronic document reflected in the print data. Examples of printing devices 104, 106, 108, 110 include, without limitation, printers, network-enabled copy machines and multi-function peripherals (MFPs), and the approaches described herein are not limited to any particular type of printing devices 104, 106, 108, 110. Embodiments of the invention are described herein in the context of four printing devices depicted in FIG. 1, but the approach is applicable to any number of printing devices disposed in the same or different physical locations. Client device 102 may provide print data to printing devices 104, 106, 108, 110 in any format and according to any communications protocol, depending upon a particular implementation. For example, any one of LPR (Line Printer Daemon), SMB, Apple Talk, DLC, TCP/IP and SNMP may be used.

User interface 114 may be implemented by any mechanism (s) and/or process(es) that allow for the exchange of information between client device 102 and users. Examples of user interface 114 include, without limitation, a display, such as a cathode ray tube (CRT) or liquid crystal display (LCD), and an input device, such as a keypad, touchpad, touch screen, keyboard or mouse, or any combination of displays and input devices.

Applications APP1 116, APP2 118 and APP3 120 may be any type of applications that are capable of generating print data. Examples of applications APP1 116, APP2 118 and APP3 120 include, without limitation, a word processing program, a spreadsheet program, an email program or any other type of application.

Print driver 122 may be implemented in computer software, computer hardware, or any combination of computer hardware and software. For example, print driver 122 may be implemented as one or more software processes executing on client device 102. As another example, print driver 122 may be implemented as executable code installed on client device 102. According to one embodiment of the invention, print driver 122 includes a print driver user interface (UI) module 126 and a rendering module 128. Print driver 122 may include other modules, elements and functionality not depicted in FIG. 1 or described herein for purposes of brevity, and the invention is not limited to print driver 122 having any particular combination of modules and functionality. Print driver UI module 126 implements the graphical user interface (GUI) on user interface 114 for print driver 122. Rendering module 128 processes print data and generates translated print data that conforms to a format supported by an intended recipient printing device. For example, rendering module 128 may process print data 130 generated by a word processing application, e.g., APP1 116, and generate translated print data that conforms to the postscript format, on the basis that the print data 130 is intended to be processed by printing device 104 and printing device 104 supports postscript. Print driver UI module 126 and rendering module 128 are described in more detail hereinafter. Client device 102 may include one print driver for each printing device 104-110 to which a user is interested in printing. For purposes of explanation, embodiments of the invention are described herein in the context of client device 102 including a single print driver 122 for printing device 104.

Storage 124 may be implemented by any type of storage. Examples of storage 124 include, without limitation, volatile memory, such as random access memory (RAM) and non-volatile storage, such as one or more disks or flash memory. Client device 102 may include other mechanisms, modules, processes, etc., depending upon a particular implementation that are not depicted in FIG. 1 or described herein for purposes of explanation. In FIG. 1, storage 124 is depicted as storing print data 130 and settings data 132 for purposes of explanation only, but storage 124 may include various other types of data. Settings data 132 may include print job settings data and printing device settings data. Print job settings data specifies the print settings specified for one or more electronic documents. Printing device settings data specifies the current print settings for the printing devices to which electronic documents are to be printed.

III. Settings Mismatch Tolerance Levels

According to one embodiment of the invention, settings mismatch tolerance levels are used to manage mismatches between print job settings and printing device settings. A tolerance level generally refers to an extent to which settings mismatches are tolerable. A set of one or more actions corresponds to each settings mismatch tolerance level and specifies actions to be taken in response to the existence of a mismatch between print job settings and printing device settings. Any number and types of settings mismatch tolerance levels may be defined for a particular implementation. An example implementation may include three settings mismatch tolerance levels: a low settings mismatch tolerance level; a medium settings mismatch tolerance level and a high settings mismatch tolerance level. FIG. 2 is a table 200 that depicts four example settings mismatch tolerance levels and the corresponding operations performed by print driver 122.

A. Low Settings Mismatch Tolerance Level

The low settings mismatch tolerance level is used for situations where it is desirable to not have any settings mismatches between print job settings and printing device settings. For example, the low tolerance level may be suitable for commercial or production printing environments, where any printing errors can be expensive. As depicted in FIG. 2, the actions corresponding to the low settings mismatch tolerance level may include the print driver visually indicating on the graphical user interface the mismatches between print job settings and printing device settings and allowing a user to change one or more printing device settings values to resolve the mismatches. The actions may also include the print driver again determining whether any mismatches exist based upon the update printing device settings values. The actions may further include the print driver not allowing the electronic document to the printed until all of the settings mismatches have been resolved.

Figure 3:
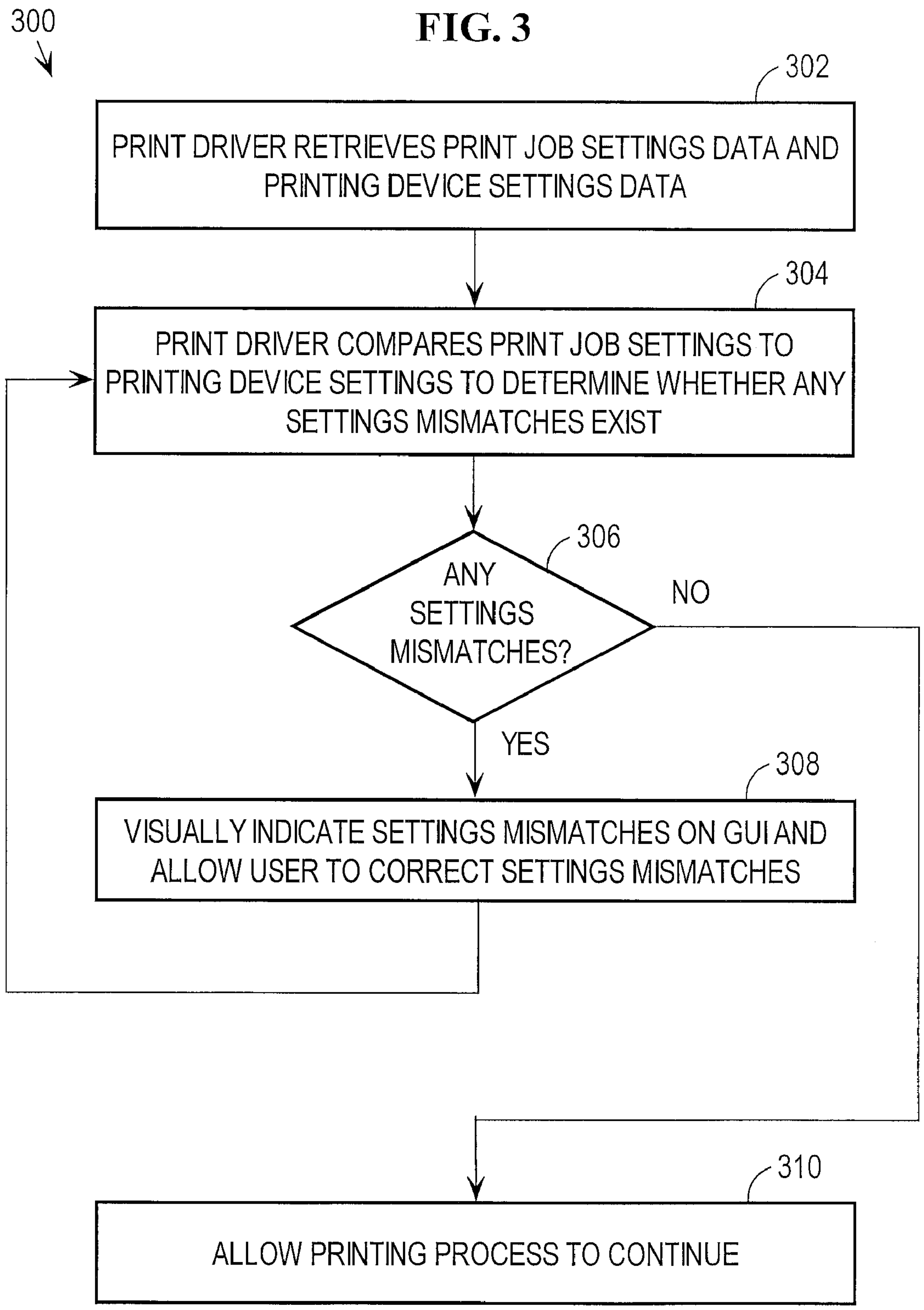
FIG. 3 is a flow diagram that depicts an approach for using a low settings mismatch tolerance level for handling mismatches between print job settings and printing device settings.

FIG. 3 is a flow diagram 300 that depicts an approach for using a low settings mismatch tolerance level for handling mismatches between print job settings and printing device settings. In step 302, print driver 122 retrieves print job settings data for the electronic document to be printed and printing device settings data. The print job settings data specifies the print settings specified for the electronic document. The print job settings data may be specified by a user via the GUI generated by print driver 122 on user interface 114. Alternatively, the print job settings data may be pre-specified by, for example, an administrator or an application program, such as APP1 116, APP2 118, APP3 120. The print job settings data may be stored in setting data 132. The printing device settings data specifies the current print settings for the printing device to which the electronic document is to be printed. The printing device settings data may be retrieved from settings data 132. Alternatively, print driver 122 may be configured to request the current printing device settings data from printing device 104.

In step 304, print driver 122 compares the print job settings to the printing device settings to determine whether any settings mismatches exist. In step 306, if any settings mismatches exist, then in step 308, print driver 122 visually indicates the settings mismatches on the GUI and allows the user to correct the mismatches. Settings mismatches may be visually indicated using a wide variety of techniques and the invention is not limited to any particular technique. For example, attributes of graphical user interface objects that correspond to the mismatched settings may be changed.

Example attributes include, without limitation, color, shape and size. The user may correct the mismatches by changing one or more of the values of the print job settings or the printing device settings.

Once the user has changed one or more of the values of the print job settings or the printing device settings, then control returns to step 304 where the print driver 122 compares the updated print job settings and printing device settings to determine whether any settings mismatches exits. If in step 306, no settings mismatches exist, then in step 310, the print driver 122 allows the printing process to continue.

B. Medium Settings Mismatch Tolerance Level

The medium settings mismatch tolerance level is used for situations where some settings mismatches are tolerable and some are not, depending upon the particular settings where the mismatches occur. For example, a mismatch on paper type may be considered to be critical because the electronic document will not be printed correctly if the electronic document is printed on the incorrect paper. Other example mismatches that may be considered to be critical, without limitation, are color/black & white printing and finishing options, such as stapling, hole punching, binding, etc.

As depicted in FIG. 2, the actions corresponding to the medium settings mismatch tolerance level may include, for mismatches for settings that are considered to be critical settings, print driver 122 visually indicating on the GUI the settings mismatches and allowing the user to correct the settings mismatch. Alternatively, if a settings mismatch for a critical setting is detected, printing of an electronic document may be aborted. For settings mismatches for non-critical settings, print driver 122 is configured to determine an appropriate setting value to resolve the mismatch. For example, suppose that the print job settings specify a first output tray on a printer and the current printing device settings specify a second output tray. Print driver 122 may resolve this settings mismatch by changing the output tray settings value in the print job settings to specify the second output tray. The medium settings tolerance provides a balance between the low and high settings mismatch tolerance levels and is useful, for example, in situations where settings mismatches for non-critical settings will not have a large adverse impact on printing.

Figure 4:
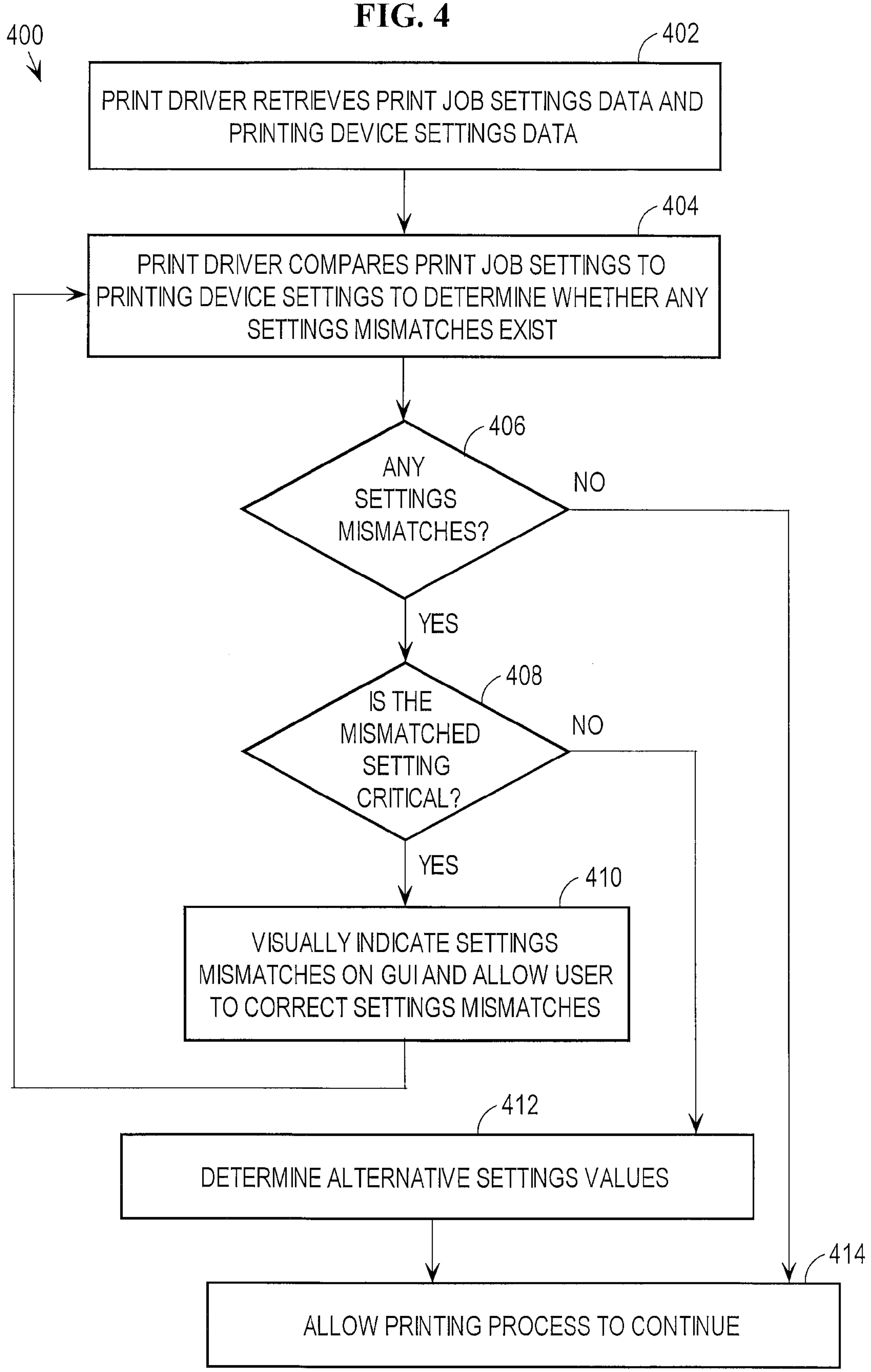
FIG. 4 is a flow diagram that depicts an approach for using a medium settings mismatch tolerance level for handling mismatches between print job settings and printing device settings.

FIG. 4 is a flow diagram 400 that depicts an approach for using a medium settings mismatch tolerance level for handling mismatches between print job settings and printing device settings. In step 402, print driver 122 retrieves print job settings data for the electronic document to be printed and printing device settings data.

In step 404, print driver 122 compares the print job settings to the printing device settings to determine whether any settings mismatches exist. In step 406, if any settings mismatches exist, then in step 408, a determination is made whether the mismatched settings are critical settings. If so, then in step 410, print driver 122 visually indicates the settings mismatches on the GUI and allows the user to correct the mismatches.

Once the user has changed one or more of the values of the print job settings or the printing device settings, then control returns to step 404 where the print driver 122 compares the updated print job settings and printing device settings to determine whether any settings mismatches exits. If, in step 408, the mismatched setting(s) are not critical, then in step 412, print driver 122 determines alternative settings values for the mismatched settings to allow the printing process to continue in step 414. For example, in the situation where the print job settings indicate a different output tray than the printing device settings, print driver 122 may change the print job settings values and/or the printing device settings values to resolve the settings mismatch. If, in step 406, no settings mismatches exist, then in step 414, the print driver 122 allows the printing process to continue.

C. High Settings Mismatch Tolerance Level

The high settings mismatch tolerance level is used for situations where settings mismatches are generally tolerable so long as the printing can be completed. The high settings mismatch tolerance level is useful in situations where users are generally not concerned about having a print job processed perfectly. Thus, the high settings mismatch tolerance level is useful for printing draft documents.

As depicted in FIG. 2, the actions corresponding to the high settings mismatch tolerance level may include determining alternative settings values to resolve settings mismatches and then allowing printing to continue with the alternative settings.

Figure 5:
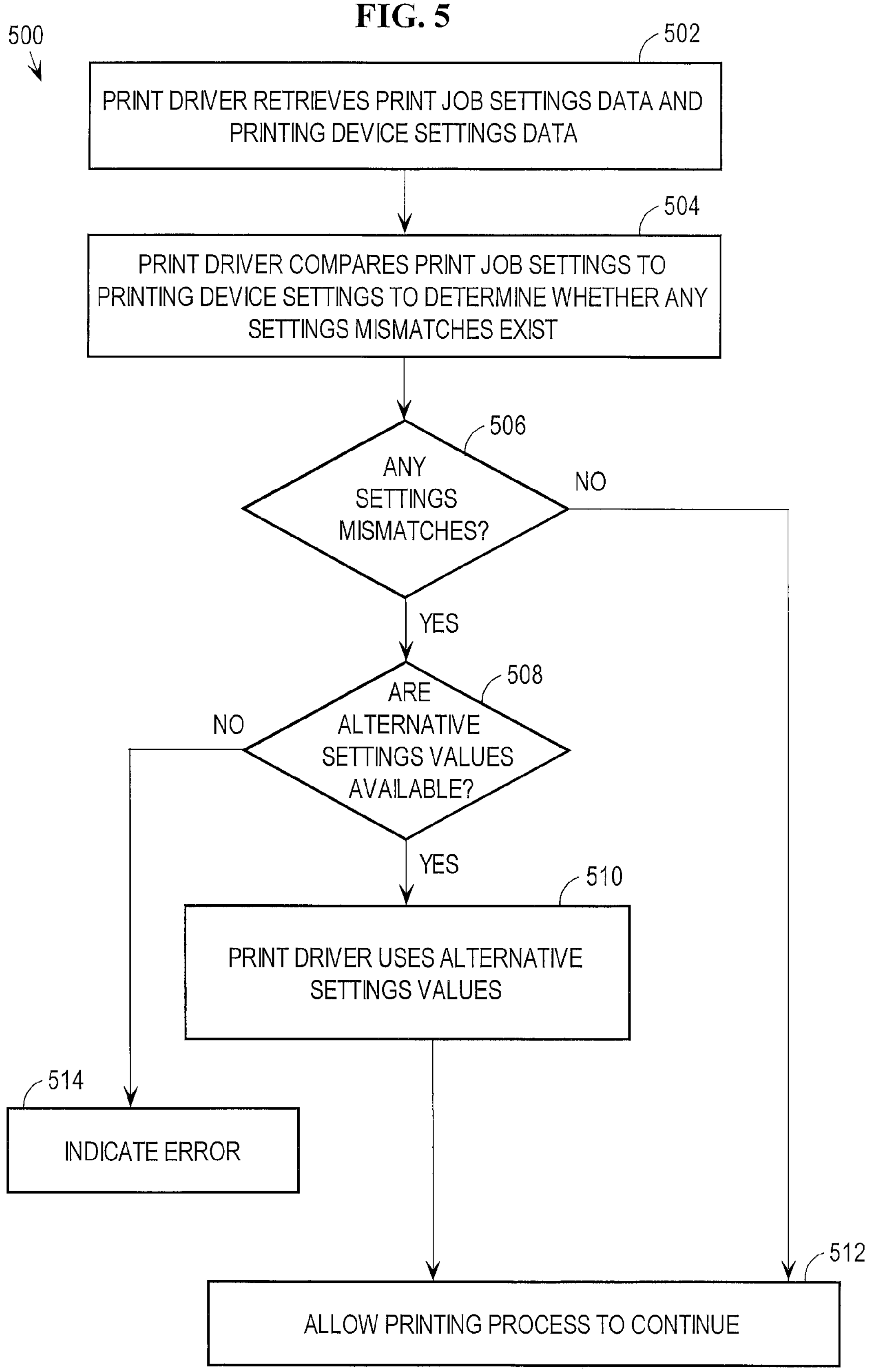
FIG. 5 is a flow diagram that depicts an approach for using a high settings mismatch tolerance level for handling mismatches between print job settings and printing device settings.

FIG. 5 is a flow diagram 500 that depicts an approach for using a high settings mismatch tolerance level for handling mismatches between print job settings and printing device settings. In step 502, print driver 122 retrieves print job settings data for the electronic document to be printed and printing device settings data.

In step 504, print driver 122 compares the print job settings to the printing device settings to determine whether any settings mismatches exist. In step 506, if any settings mismatches exist, then in step 508, a determination is made whether alternative settings values are available. For example, in the situation where the print job settings indicate a different output tray than the printing device settings, print driver 122 may change the print job settings values and/or the printing device settings values to resolve the settings mismatch. If alternative settings values can be used, then in step 510, print driver 122 uses the alternative settings values and in step 512, print driver 122 allows the printing process to continue in step 514. If, in step 506, no settings mismatches exist, then in step 512, the print driver 122 allows the printing process to continue. If in step 508, a determination is made that no alternative settings values are available, then in step 514 an error is indicated. This may include print driver 122 visually indicating on the GUI that a settings mismatch has occurred and there are no available alternative settings values that can be used.

D. Custom Settings Mismatch Tolerance Level

The custom settings mismatch tolerance level is used for situations where users want to specify how settings mismatches are to be handled. This may include a user specifying settings values to be used if a settings mismatch occurs. The customized settings mismatch values may be specified via a graphical user interface generated by print driver 122. Alternatively, the customized settings mismatch values may be specified in a configuration file or by other means.

Figure 6:
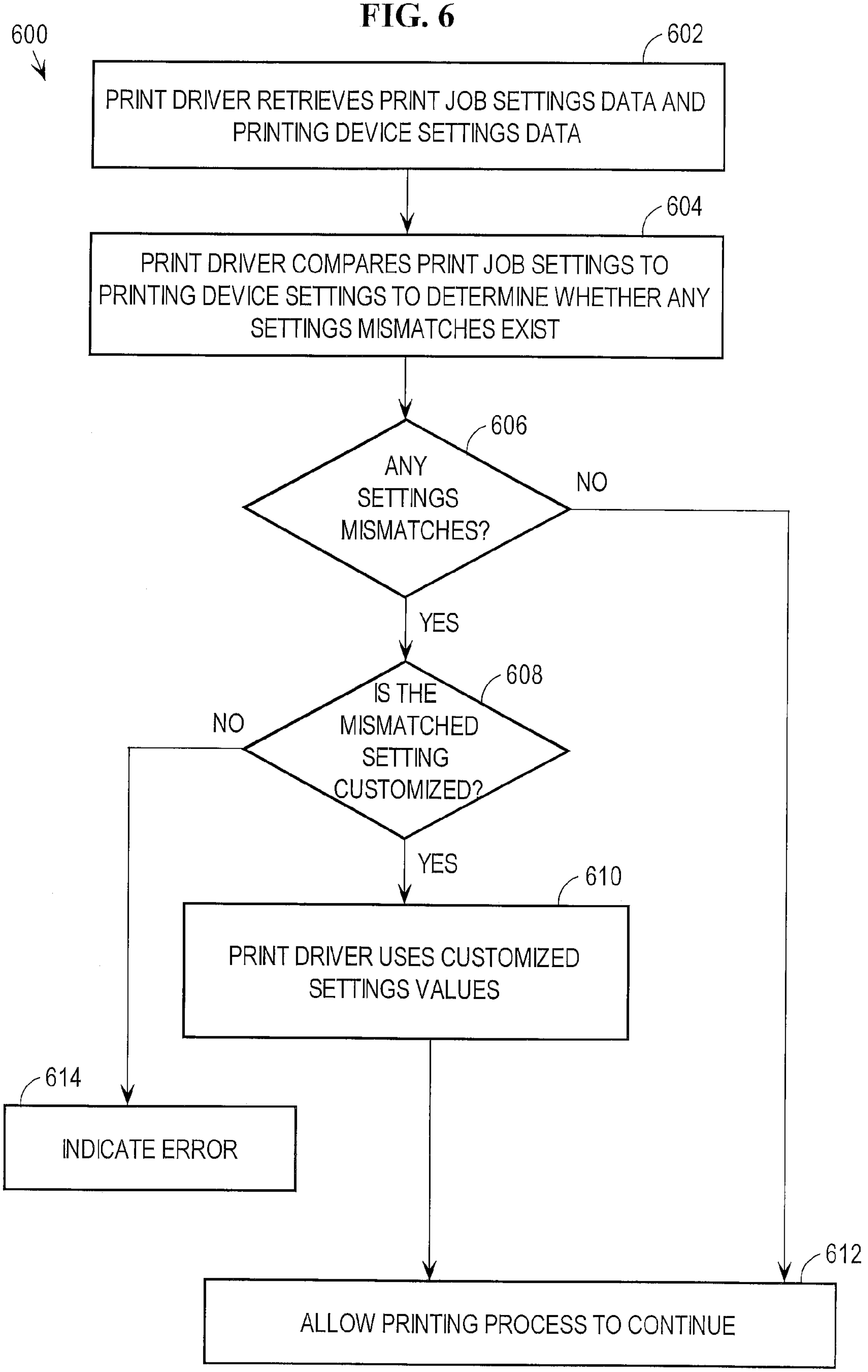
FIG. 6 is a flow diagram that depicts an approach for using a Customized settings mismatch tolerance level for handling mismatches between print job settings and printing device settings.

As depicted in FIG. 2, the actions corresponding to the custom settings mismatch tolerance level may include determining custom settings values to resolve settings mismatches and then allowing printing to continue with the custom settings. The custom settings allow a user to select particular areas where the FIG. 6 is a flow diagram 600 that depicts an approach for using a custom settings mismatch tolerance level for handling mismatches between print job settings and printing device settings. In step 602, print driver 122 retrieves print job settings data for the electronic document to be printed and printing device settings data.

In step 604, print driver 122 compares the print job settings to the printing device settings to determine whether any settings mismatches exist. In step 606, if any settings mismatches exist, then in step 608, a determination is made whether the mismatched setting is a customized setting. If so, then customized settings values are available and are used in step 610 and the printing process is allowed to continue in step 612. For example, in the situation where the print job settings indicate a different output tray than the printing device settings, print driver 122 may change the print job settings values and/or the printing device settings values to the custom settings values. As another example, suppose that the print job settings for a particular electronic document indicate color printing and the printing device settings indicate black and white printing. Normally this type of mismatch might cause an error and prevent the electronic document from being printed. If, however, the black and white/color setting is customized to indicate that black and white printing is to be used, then the particular electronic document can be printed without an error.

In step 608, if the mismatched setting is not customized, then an error is indicated in step 614. Alternatively, print driver 122 may select alternative settings values to be used to allow the particular electronic document to be printed.

E. Selecting Settings Mismatch Tolerance Levels

Figure 7:
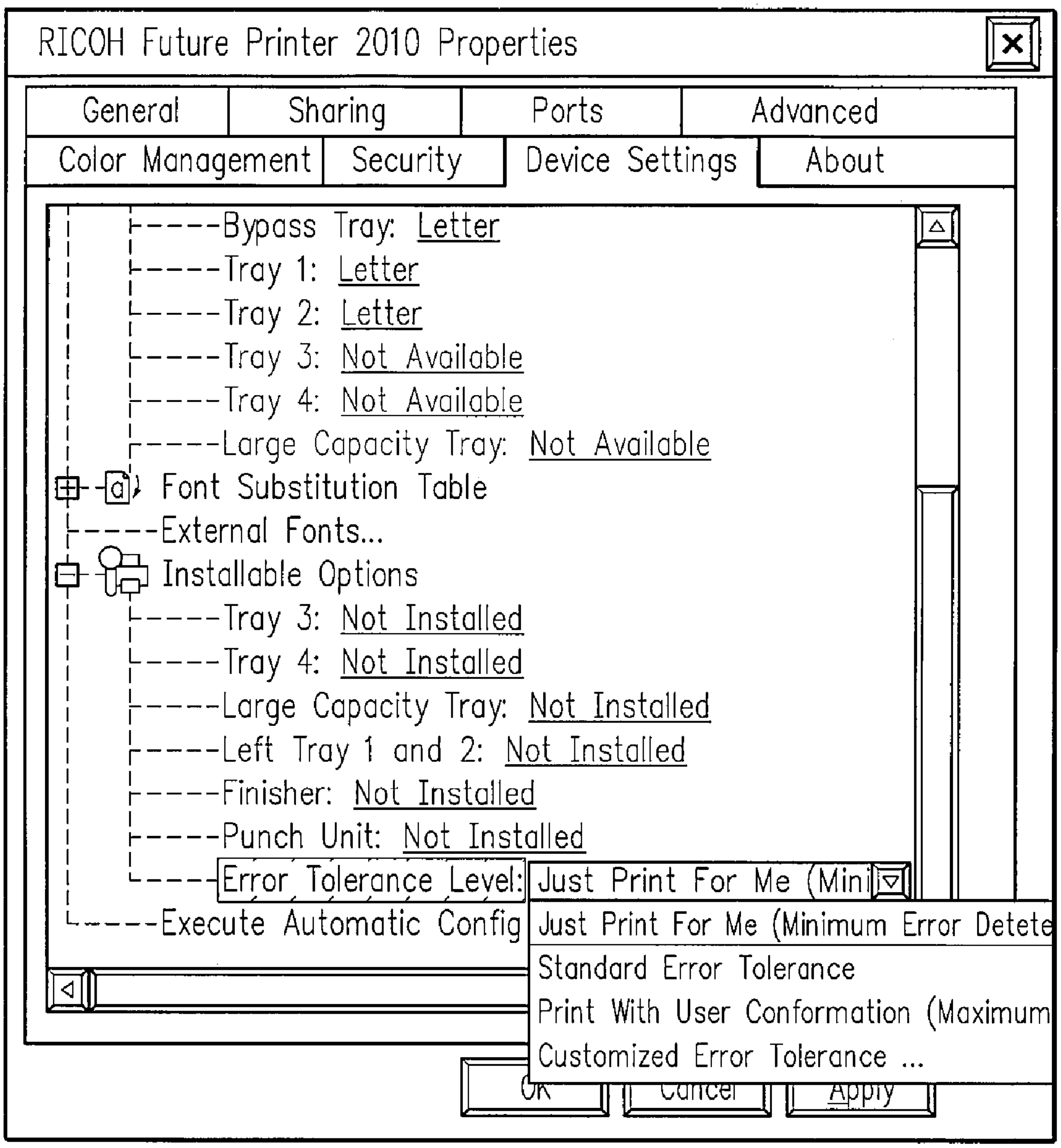
FIG. 7 is a diagram that depicts an example graphical user interface for selecting a settings mismatch tolerance level.

Settings mismatch tolerance levels may be specified using a variety of techniques, depending upon a particular implementation. For example, a user may specify a tolerance level via a graphical user interface generated by print driver 122. FIG. 7 is a diagram that depicts an example graphical user interface 700 for selecting a settings mismatch tolerance level. In this example, a settings mismatch tolerance level is referred to as an "Error Tolerance Level" and selected using graphical user interface controls in the form of a pull-down menu. This example includes four tolerance levels. The "Just for Me" option is a high tolerance level that is designed for personal users. The "Standard Error Tolerance" option is a medium tolerance level and the "Print with User Conformation" is a low tolerance level. The "Customized Error Tolerance" option is a custom settings mismatch tolerance level. Settings mismatch tolerance levels may also be set via configuration data stored on a client device, e.g., settings data 132.

Figure 8:
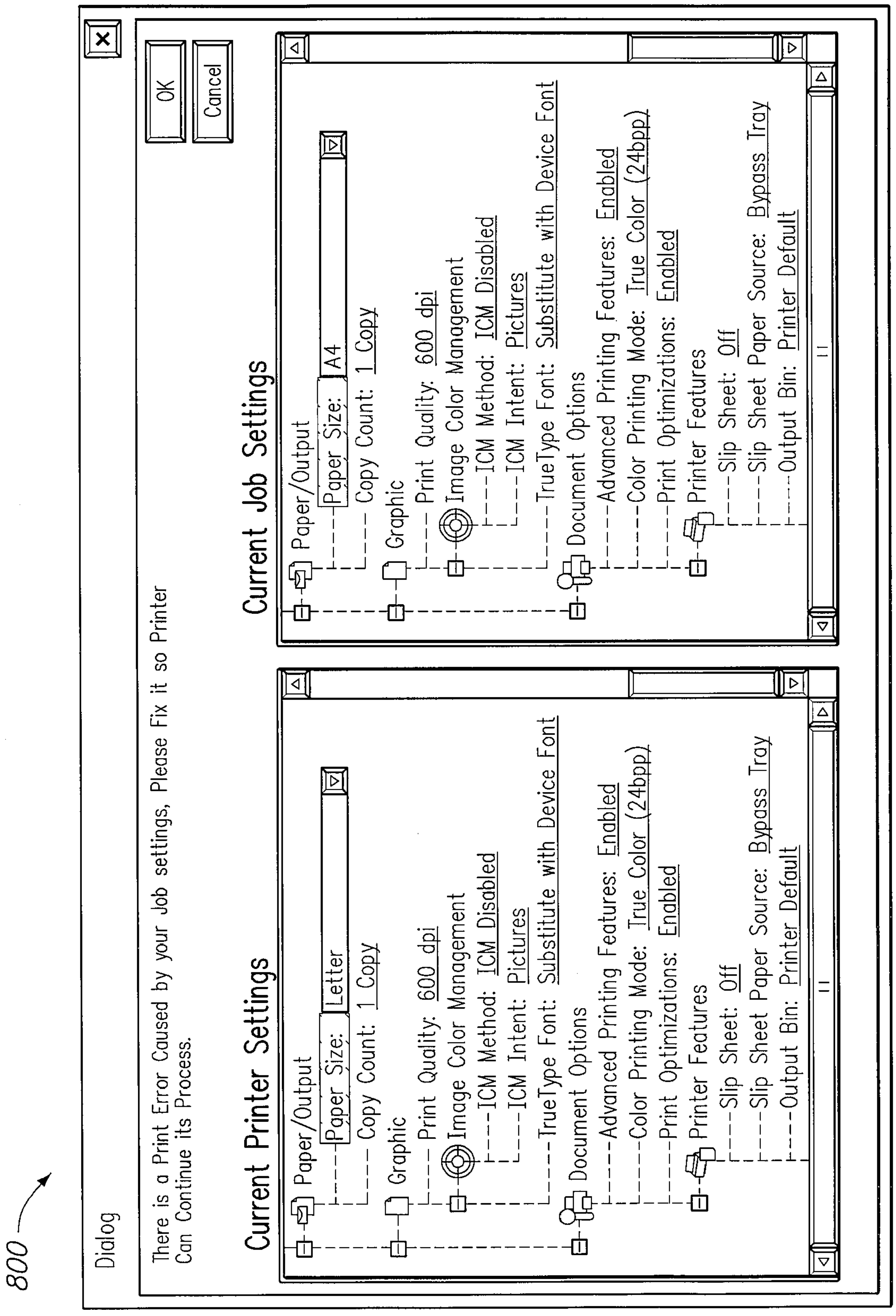
FIG. 8 depicts an example graphical user interface screen that depicts a paper size setting mismatch between the current printing device settings and the current print job settings.

FIG. 8 depicts an example graphical user interface screen 800 that depicts a paper size setting mismatch between the current printing device settings and the current print job settings. The current printing device settings specify a paper size of "letter", while the current job settings specify a paper size of "A4". The user can easily recognize a mismatch between the current printing device setting and the current job settings.

IV. WSD Implementations

The approach described herein for using settings mismatch tolerance levels to handle mismatches between print job settings and printing device settings is also applicable to Web Services implementations and in particular, to WSD printing devices. According to one embodiment of the invention, print driver 122 is configured to use print job tickets to determine whether a settings mismatch exists between print job settings and printing device settings. Print driver 122 generates a print job ticket for a particular electronic document. The print job ticket defines how the particular electronic document is to be printed on a particular printing device. Print driver 122 transmits the print job ticket to the particular printing device for validation. The particular printing device validates the print job ticket by comparing the print settings values contained in the print job ticket to the current settings values of the particular printing device and generates and returns to print driver 122 data that indicates whether there are any settings mismatches. Print driver 122 processes the data received from the particular printing device and visually indicates any settings mismatches on the graphical user interface. For example, settings mismatches may be visually indicated by changing one or more visual attributes of user interface objects that correspond to printing settings, such as color, shape, size, etc. Print driver 122 may also query the particular printing device for its current print settings to be displayed on the graphical user interface. A user may revise the print settings values and print driver 122 generates a revised print job ticket. Print driver 122 then transmits the revised print job ticket to the particular printing device for validation. If the particular printing device indicates that no settings mismatches exist between the revised print settings values and the current settings values of the particular printing device, then print driver 122 generates and transmits the Printer Description Language (PDL) part of the print job to the particular printing device for processing.

Alternatively, print driver 122 may transmit both the initial print job ticket and the PDL part of the print job to the particular printing device for processing. The particular printing device validates the print job ticket and generates and returns data to print driver 122 indicating whether any mismatches exist. If data received by print driver 122 from the particular printing device indicates that there are mismatches between the print settings values contained in the print job ticket and the current settings values of the particular printing device, then print driver 122 visually indicates the mismatches on the graphical user interface. The user updates the print settings values and print driver 122 generates and transmits to the particular printing device a revised print job ticket. The particular printing device validates the revised print job ticket against the current print settings of the particular printing device. Once a determination is made that no print settings mismatches exist, then the particular printing device replaces the original print job ticket with the properly validated print job ticket, i.e., the one for which no settings mismatches exist, and processes the print job.

Figure 9:
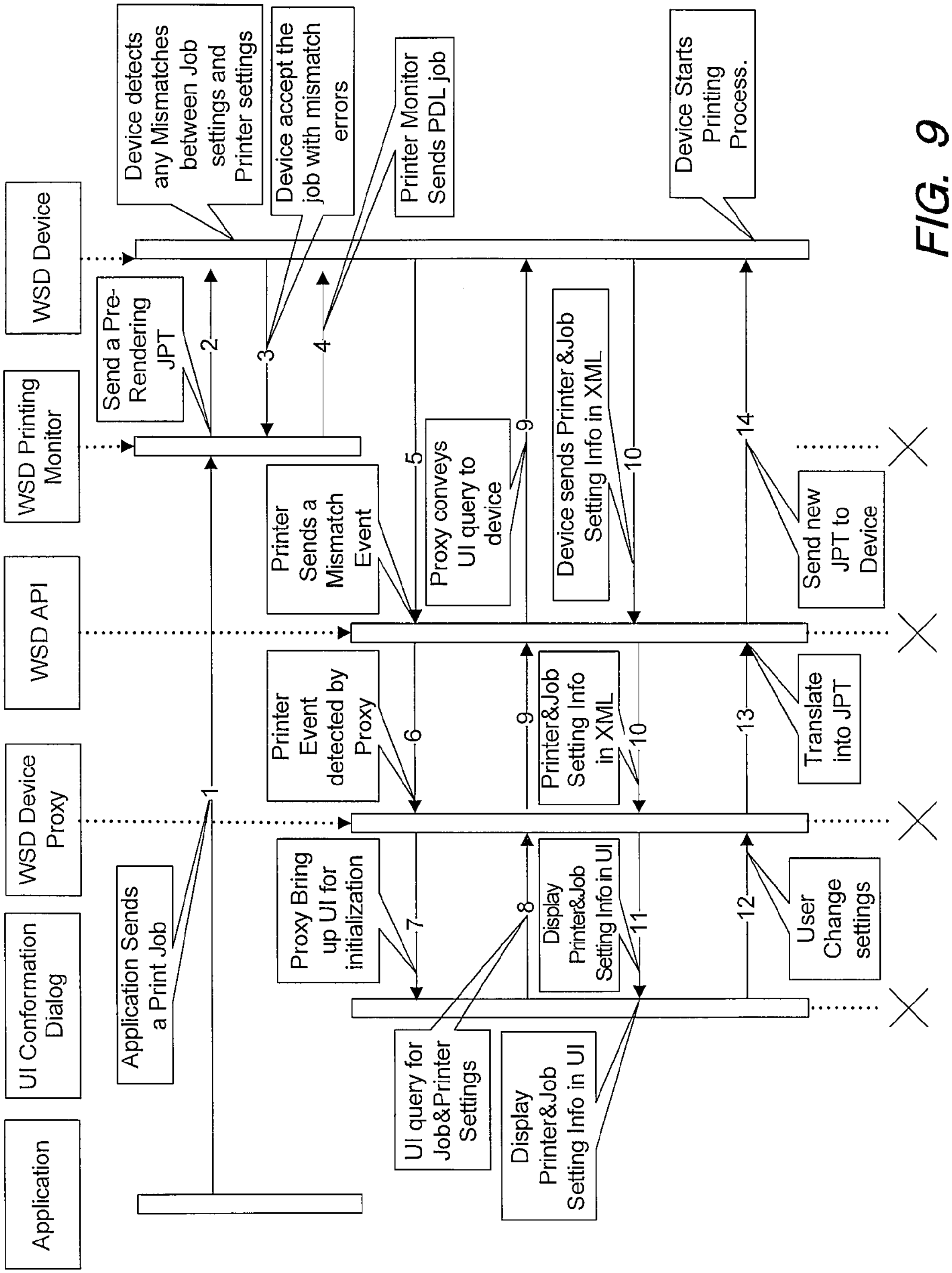
FIG. 9 is a state diagram that depicts an example approach for handling mismatches between print job settings and printing device settings using replacement job tickets.

FIG. 9 is a state diagram that depicts an example approach for handling mismatches between print job settings and printing device settings using replacement job tickets. In FIG. 9, the "Application" is an application program, such as a word processing program, an email client or a spreadsheet program. The "UI Conformation Dialog" and "WSD Device Proxy" elements are implemented by a print driver. For purposes of explanation, the "UI Conformation Dialog" is, or is part of, print driver UI module operating in a settings mismatch low tolerance mode. The "WSD API", "WSD Print Monitor" and "WSD Device" elements are part of a WSD printing device which, in this example, is a WSD printing device.

In step 1, the Application generates and sends a print job to the WSD Printing Monitor. The print job includes an initial print job ticket generated based upon the print job settings selected via the graphical user interface generated by print driver. The print job also includes the PDL part of the print job that contains the print data. In step 2, the WSD Printing Monitor sends the initial print job ticket, referred to in FIG. 9 as the "Pre-Rendered JPT (Job Print Ticket)" to the WSD Device. The WSD Device compares the print settings values contained the data contained in the initial print job ticket to the current print settings on the WSD Device to determine whether any settings mismatches exist. Assuming that at least one settings mismatch exists, in step 3, the WSD Device accepts the print job with the settings mismatch and notifies the WSD Printing Monitor. In step 4, the WSD Printing Monitor provides the PDL part of the print job to the WSD Device. In step 5, the WSD API generates a settings mismatch event that in step 6 is detected by the WSD Device Proxy. In step 7, the WSD Device Proxy causes the UI Conformation Dialog module to generate and display a graphical user interface to be initialized. In steps 8 and 9, the UI Conformation Dialog module generates a query for the current WSD Device settings and the query is provided to the WSD Device via the WSD Proxy module and the WSD API.

In step 10, the WSD Device generates and in step 11 transmits a response to the request to the UI Conformation Dialog module via the WSD Device Proxy. The response includes the current print settings for the WSD Device. The response may be in a variety of formats, depending upon a particular implementation. For example, the response may include XML data that indicates the current print settings for the WSD Device. As another example, the response may be formatted as a default print job ticket. After receiving the response, the UI Conformation Dialog module displays the current print settings for the WSD Device on the graphical user interface and allows the user to change one or more of the settings. For example, UI Conformation Dialog module may generate checkbox controls whose members come from a printer capability file received from the WSD Device, where the current values are extracted from the default print job ticket received from the WSD Device and the initial print job ticket whose values were previously specified by the user. Table I below shows how check boxes may be generated based upon options from a printer capability file and settings from the initial print job ticket (JPT) and a default print ticket (DPT).

TABLE I

```
Check box populated with options from Printer Capability file:
<wprt:SlipSheet>
    <wprt:AllowedValue>
        <wprt:Option>
            OFF
        </wprt:Option>
    </wprt:AllowedValue>
    <wprt:AllowedValue>
        <wprt:Option>
            ON
        </wprt:Option>
    </wprt:AllowedValue>
</wprt:SlipSheet>
Current settings from JPT and DPT:
<wprt:SlipSheet>
    OFF
</wprt:SlipSheet>
```

In step 12 the user changes one or more of the print job settings values or printing device settings values. In steps 13 and 14, a revised print job ticket is generated and transmitted to the WSD Device via the WSD API. The WSD Device replaces the initial print job ticket with the revised print job ticket and then processes the print job.

Since in the context of WSD printing, a print job data package includes two parts, the print job ticket part and the PDL data part, a WSD printing device can easily detect the border of those two parts, and split them into two. When a new print job ticket is received, the WSD printing device can replace the current print job ticket with the new print job ticket. According to one embodiment of the invention, the process of replacing a current print job ticket with a new print job ticket includes a print driver generating and sending a "CreatePrintJobRequest" request to a WSD printing device, with a print job ticket as the parameter of the request. A print job name is defined inside the print job ticket that has the same name of the print job that is pending at the WSD printing device. An example format of a "CreatePrintJobRequest" request is as follows:

```
<wprt:CreatePrintJobRequest>
    <wprt:PrintTicket>
        <wprt:JobDescription>
            <wprt:JobName>Pending Job Name</wprt:JobName>
            .
            .
            .
        </wprt:JobDescription>
    <wprt:PrintTicket>
<wprt:CreatePrintJobRequest>
```

When the WSD printing device receives the request, the WSD printing device reads the print job name contained in the print job ticket to determine whether it matches the name of the current pending print job. If so, then it replaces the current print job ticket with the new print job ticket. If the print job name contained in the print job ticket does not match the name of the current pending print job inside JPT, then the WSD printing device processes the print job request as a new request. An example format for a pending print job at a WSD printing devices is shown in the following Table II. The content in quotes is treated as a print job ticket. The data following the print job ticket is example PDL data.

TABLE II

```
%-12345X@PJL SET PRINTTICKETSIZE="2068"
@PJL SET PRINTTICKET="
<!-- ********Job Print Ticket(JPT)**************** -->
~     <Wprt:PritTicket>
        <Wprt:JobDescription>
            <Wprt:JobName>Example Document</Wprt:JobName>
        </Wprt:JobDescription>
        <Wprt:JobProcessing>
            <Wprt:Copies>3</Wprt:Copies>
        </Wprt:JobProcessing>
~     </ Wprt:PritTicket>
<!-- ********Printer Job Data (PDLData)**************** -->"
@PJL ENTER LANGUAGE=PCLXL
ÑX'f8‰ÀÿŸ8†À/Ÿ8ÀÀÿŸ8ˆÀ'f8,HÀÿ'f8{ÀÿŸ8%CÔd
ÿ'f8^uÕÿ'0€?ÿ'0€?ø÷wÀ'f8/Àÿ'f8~xÀÿ'f8-
|Àüø,(...ÊÁ/'0ÿ'0ÿ'f8¼Àÿ'f8©ÊÀÿS PCLXLFont
001ø¨OÀŒ'0ø$PŒ'0ÿ'0'feÿ'3eÁ
ÿ'f8$PŒBRÿ'0ÿ'4Á_'0ø$PŒ_'ffÿÿ'0ÿ'0ŒÈÀÿS PCLXLFont
001ø¨Åÿ'0¦Bø¦Á'0ø±ºÕÿ'0€?ÿ'0€?ø¤ëÈÀÿS PCLXLFont
001ø¨RÁ'0ø¢ÁB'f8£SŒB'0ÿ'0ÿ'0o'04ÿÿÿ
þÿ'0ÿÿÿÿ'0ÿÿÿ€ÿ'ffÿ'fÿÀÿ'ffÿ'1ÿÀÿ'f
ÿ'ff{'fÿÀÿ'ffÿ'1ÿÀÿ'ffÿ'ÿ'ffÿ'fÿÀÿff
```

V. Implementation Mechanisms

Figure 10:
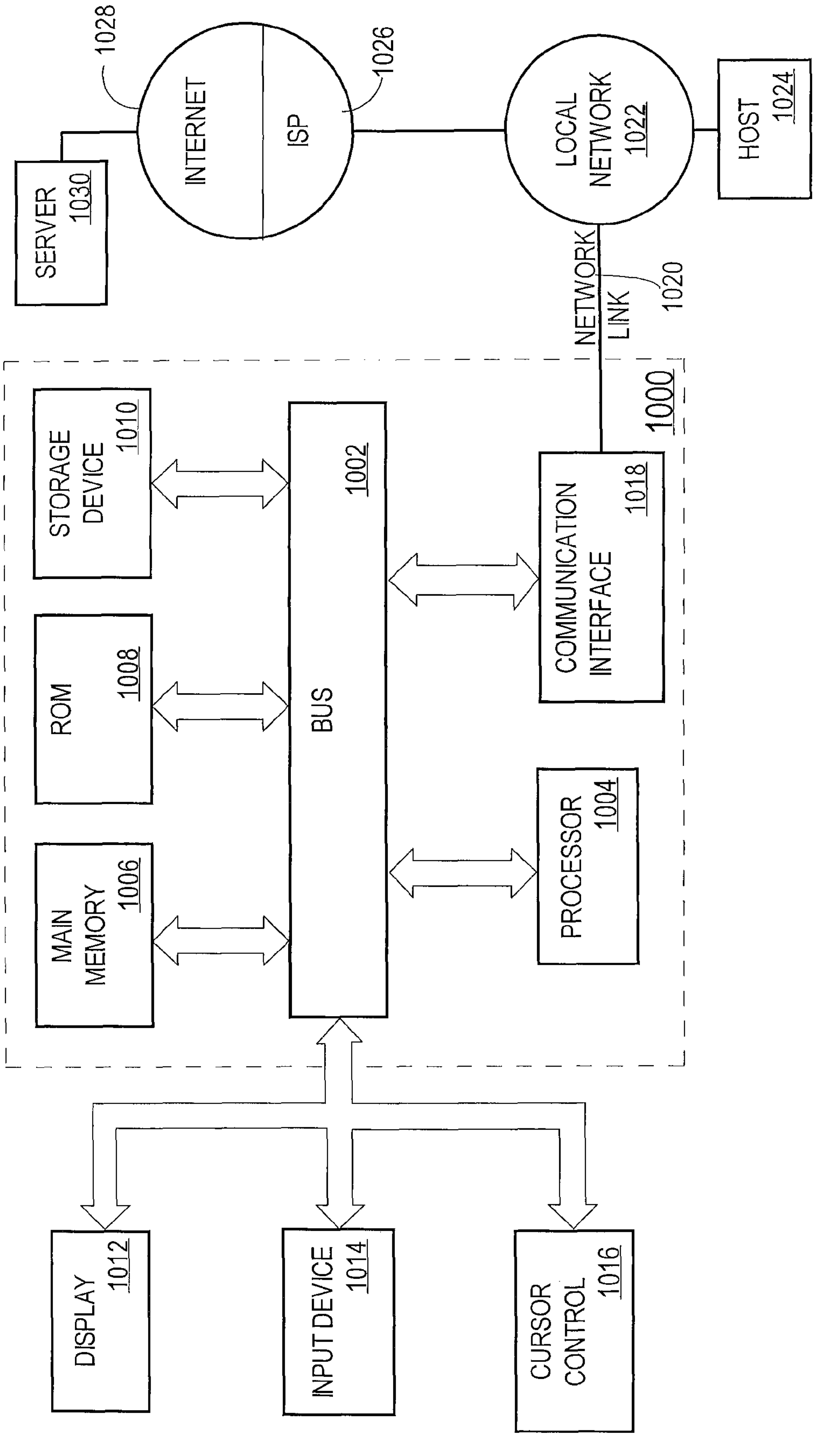
FIG. 10 is a block diagram of a computer system on which embodiments of the invention may be implemented.

The approach described herein for printing policy-enabled electronic documents using locked printing may be implemented on any type of computing platform or architecture. For purposes of explanation, FIG. 10 is a block diagram that depicts an example computer system 1000 upon which embodiments of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1000, various computer-readable media are involved, for example, in providing instructions to processor 1004 for execution. Such a medium may take many forms, including but not limited to, non-volatile media and volatile media. Non-volatile media includes, for example, optical or magnetic disks, such as storage device 1010. Volatile media includes dynamic memory, such as main memory 1006. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing mismatches between print job settings and printing device settings, the computer-implemented method comprising:

a print driver generating a graphical user interface that allows a user to select a print settings mismatch tolerance level from a plurality of print settings mismatch tolerance levels, wherein each print settings mismatch tolerance level from the plurality of print settings mismatch tolerance levels has one or more corresponding actions that are performed in response to a mismatch between a set of print settings specified for an electronic document to be printed and a set of print settings specified for a printing device on which the electronic document is to be printed, wherein a first print settings mismatch tolerance level from the plurality of print settings mismatch tolerance levels has at least one corresponding action that is different than one or more actions that correspond to a second print settings mismatch tolerance level from the plurality of print settings mismatch tolerance levels;

the print driver detecting, via the graphical user interface, a selection of a particular print settings mismatch tolerance level from the plurality of print settings mismatch tolerance levels, wherein the particular print settings mismatch tolerance level has one or more particular actions that correspond thereto;

after detecting, via the graphical user interface, the selection of the particular print settings mismatch tolerance level from the plurality of print settings mismatch tolerance levels, the print driver determining whether a mismatch exists between a set of print settings specified for a particular electronic document to be printed and a set of print settings specified for a particular printing device on which the particular electronic document is to be printed; and in response to determining that a mismatch exists between the set of print settings specified for the particular electronic document to be printed and the set of print settings specified for the particular printing device on which the particular electronic document is to be printed, the print driver performing the one or more particular actions corresponding to the particular print settings mismatch tolerance level selected via the graphical user interface to address the mismatch between the set of print settings specified for the particular electronic document to be printed and the set of print settings specified for the particular printing device on which the particular electronic document is to be printed.

2. The computer-implemented method as recited in claim 1, wherein the computer-implemented method further comprises:

the print driver requesting from the particular printing device settings data that specifies the set of print settings specified for the particular printing device, the print driver receiving from the particular printing device settings data that specifies the set of print settings specified for the particular printing device, and the print driver determining whether a mismatch exists between a set of print settings specified for a particular electronic document to be printed and a set of print settings specified for a particular printing device on which the particular electronic document is to be printed includes the print driver comparing the set of print settings specified for the particular electronic document to be printed and the set of print settings specified for the particular printing device specified by the printing device settings data.

3. The computer-implemented method as recited in claim 1, wherein the print driver performing the one or particular more actions corresponding to the particular print settings mismatch tolerance level to address the mismatch between the set of print settings specified for the particular electronic document to be printed and the set of print settings specified for the particular printing device on which the particular electronic document is to be printed includes:

the print driver visually indicating on the graphical user interface the mismatch between the set of print settings specified for the particular electronic document to be printed and the set of print settings specified for the particular printing device on which the particular electronic document is to be printed, and the print driver allowing to be changed one or more print settings from the set of print settings specified for the particular electronic document to be printed or the set of print settings specified for the particular printing device on which the particular electronic document is to be printed, and the print driver again determining whether a mismatch exists between the set of print settings specified for the particular electronic document to be printed and the set of print settings specified for the particular printing device on which the particular electronic document is to be printed.

4. The computer-implemented method as recited in claim 3, further comprising not allowing the particular electronic document to be printed on the particular printing device until all mismatches between the set of print settings specified for the particular electronic document to be printed and the set of print settings specified for the particular printing device on which the particular electronic document is to be printed are resolved.

5. The computer-implemented method as recited in claim 1, further comprising if the particular print settings mismatch tolerance level corresponds to a low tolerance level and if a mismatch does not exist between the set of print settings specified for the particular electronic document to be printed and the set of print settings specified for the particular printing device on which the particular electronic document is to be printed, then the print driver causing to be displayed on the graphical user interface data that indicates the set of print settings specified for the particular electronic document to be printed and the set of print settings specified for the particular printing device on which the particular electronic document is to be printed.

6. The computer-implemented method as recited in claim 1, further comprising if the particular print settings mismatch tolerance level corresponds to a medium tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes:

the print driver determining whether a particular setting, for which a mismatch exists, is a critical setting, if the particular setting is a critical setting, then the print driver indicating on the graphical user interface that a mismatch exists for the particular setting and allowing a user to modify one or more values for the particular setting, and if the particular setting is not a critical setting, then the print driver automatically determining an alternative value for the particular setting and allowing printing of the particular electronic document to proceed using the alternative value for the particular setting.

7. The computer-implemented method as recited in claim 1, wherein:

determining that a mismatch exists between the set of print settings specified for the particular electronic document to be printed and the set of print settings specified for the particular printing device on which the particular electronic document is to be printed includes determining that a particular print setting value for the particular electronic document to be printed does not match a corresponding print setting value for the particular printing device, and if the particular print settings mismatch tolerance level corresponds to a high tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes the print driver using a common value for both the particular print setting for the particular electronic document to be printed and the particular print setting for the particular printing device.

8. The computer-implemented method as recited in claim 1, wherein:

determining that a mismatch exists between the set of print settings specified for the particular electronic document to be printed and the set of print settings specified for the particular printing device on which the particular electronic document is to be printed includes determining that a particular print setting value for the particular electronic document to be printed does not match a corresponding print setting value for the particular printing device, and if the particular print settings mismatch tolerance level corresponds to a custom tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes the print driver using a user-specified value for both the particular print setting for the particular electronic document to be printed and the particular print setting for the particular printing device.

9. The computer-implemented method as recited in claim 8, further comprising, if the data received from the particular printing device indicates that a mismatch exists between a set of print settings specified for a particular electronic document to be printed and a set of print settings specified for a particular printing device on which the particular electronic document is to be printed, then the print driver:

allowing a user to specify, via the graphical user interface, a set of revised print settings for the particular electronic document to be printed, generate, based upon the set of revised print settings specified for the particular electronic document, a second print job ticket that indicates how the particular electronic document is to be printed on the particular printing device, wherein the second print job ticket is different than the print job ticket, transmit the second print job ticket to the particular printing device, and receive, from the particular printing device, second data that indicates whether a mismatch exists between the revised set of print settings specified for the particular electronic document to be printed and the set of print settings specified for the particular printing device on which the particular electronic document is to be printed.

10. The computer-implemented method as recited in claim 1, wherein the print driver determining whether a mismatch exists between a set of print settings specified for a particular electronic document to be printed and a set of print settings specified for a particular printing device on which the particular electronic document is to be printed includes the print driver:

generating, based upon the set of print settings specified for the particular electronic document, a print job ticket that indicates how the particular electronic document is to be printed on the particular printing device, transmitting the print job ticket to the particular printing device, and receiving, from the particular printing device, data that indicates whether a mismatch exists between a set of print settings specified for a particular electronic document to be printed and a set of print settings specified for a particular printing device on which the particular electronic document is to be printed.

11. A non-transitory computer-readable medium for managing mismatches between print job settings and printing device settings, the computer-readable medium carrying instructions which, when processed by one or more processors, causes:

a print driver generating a graphical user interface that allows a user to select a print settings mismatch tolerance level from a plurality of print settings mismatch tolerance levels, wherein each print settings mismatch tolerance level from the plurality of print settings mismatch tolerance levels has one or more corresponding actions that are performed in response to a mismatch between a set of print settings specified for an electronic document to be printed and a set of print settings specified for a printing device on which the electronic document is to be printed, wherein a first print settings mismatch tolerance level from the plurality of print settings mismatch tolerance levels has at least one corresponding action that is different than one or more actions that correspond to a second print settings mismatch tolerance level from the plurality of print settings mismatch tolerance levels;

the print driver detecting, via the graphical user interface, a selection of a particular print settings mismatch tolerance level from the plurality of print settings mismatch tolerance levels, wherein the particular print settings mismatch tolerance level has one or more particular actions that correspond thereto;

after detecting, via the graphical user interface, the selection of the particular print settings mismatch tolerance level from the plurality of print settings mismatch tolerance levels, the print driver determining whether a mismatch exists between a set of print settings specified for a particular electronic document to be printed and a set of print settings specified for a particular printing device on which the particular electronic document is to be printed; and in response to determining that a mismatch exists between the set of print settings specified for the particular electronic document to be printed and the set of print settings specified for the particular printing device on which the particular electronic document is to be printed, the print driver performing the one or more particular actions corresponding to the particular print settings mismatch tolerance level selected via the graphical user interface to address the mismatch between the set of print settings specified for the particular electronic document to be printed and the set of print settings specified for the particular printing device on which the particular electronic document is to be printed.

12. The non-transitory computer-readable medium as recited in claim 11, wherein the computer-readable medium further carries additional instructions which, when processed by the one or more processors, causes:

the print driver requesting from the particular printing device settings data that specifies the set of print settings specified for the particular printing device, the print driver receiving from the particular printing device settings data that specifies the set of print settings specified for the particular printing device, and the print driver determining whether a mismatch exists between a set of print settings specified for a particular electronic document to be printed and a set of print settings specified for a particular printing device on which the particular electronic document is to be printed includes the print driver comparing the set of print settings specified for the particular electronic document to be printed and the set of print settings specified for the particular printing device specified by the printing device settings data.

13. The non-transitory computer-readable medium as recited in claim 11, wherein the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes:

the print driver visually indicating on the graphical user interface the mismatch between the set of print settings specified for the particular electronic document to be printed and the set of print settings specified for the particular printing device on which the particular electronic document is to be printed, and the print driver allowing one or more print settings from the set of print settings specified for the particular electronic document to be printed or the set of print settings specified for the particular printing device on which the particular electronic document is to be printed to be changed, and the print driver again determining whether a mismatch exists between a set of print settings specified for a particular electronic document to be printed and a set of print settings specified for the particular printing device on which the particular electronic document is to be printed.

14. The non-transitory computer-readable medium as recited in claim 13, wherein the computer-readable medium further carries additional instructions which, when processed by the one or more processors, causes not allowing the particular electronic document to be printed on the particular printing device until all mismatches between the set of print settings specified for the particular electronic document to be printed and the set of print settings specified for the particular printing device on which the particular electronic document is to be printed are resolved.

15. The non-transitory computer-readable medium as recited in claim 11, wherein the computer-readable medium further carries additional instructions which, when processed by the one or more processors, causes if the particular print settings mismatch tolerance level corresponds to a low tolerance level and if a mismatch does not exist between the set of print settings specified for the particular electronic document to be printed and the set of print settings specified for the particular printing device on which the particular electronic document is to be printed, then the print driver causing to be displayed on the graphical user interface data that indicates the set of print settings specified for the particular electronic document to be printed and the set of print settings specified for the particular printing device on which the particular electronic document is to be printed.

16. The non-transitory computer-readable medium as recited in claim 11, wherein the computer-readable medium further carries additional instructions which, when processed by the one or more processors, causes if the particular print settings mismatch tolerance level corresponds to a medium tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes:

the print driver determining whether a particular setting, for which a mismatch exists, is a critical setting, if the particular setting is a critical setting, then the print driver indicating on the graphical user interface that a mismatch exists for the particular setting and allowing a user to modify one or more values for the particular setting, and if the particular setting is not a critical setting, then the print driver automatically determining an alternative value for the particular setting and allowing printing of the particular electronic document to proceed using the alternative value for the particular setting.

17. The non-transitory computer-readable medium as recited in claim 11, wherein:

determining that a mismatch exists between the set of print settings specified for the particular electronic document to be printed and the set of print settings specified for the particular printing device on which the particular electronic document is to be printed includes determining that a particular print setting value for the particular electronic document to be printed does not match a corresponding print setting value for the particular printing device, and if the particular print settings mismatch tolerance level corresponds to a high tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes the print driver using a common value for both the particular print setting for the particular electronic document to be printed and the particular print setting for the particular printing device.

18. The non-transitory computer-readable medium as recited in claim 11, wherein:

determining that a mismatch exists between the set of print settings specified for the particular electronic document to be printed and the set of print settings specified for the particular printing device on which the particular electronic document is to be printed includes determining that a particular print setting value for the particular electronic document to be printed does not match a corresponding print setting value for the particular printing device, and if the particular print settings mismatch tolerance level corresponds to a custom tolerance level then the print driver performing the one or more particular actions corresponding to the particular print settings mismatch tolerance level to address the mismatch between the set of print settings specified for the particular electronic document to be printed and the set of print settings specified for the particular printing device on which the particular electronic document is to be printed includes the print driver using a user-specified value for both the particular print setting for the particular electronic document to be printed and the particular print setting for the particular printing device.

19. The non-transitory computer-readable medium as recited in claim 11, wherein the print driver determining whether a mismatch exists between a set of print settings specified for a particular electronic document to be printed and a set of print settings specified for the particular printing device on which the particular electronic document is to be printed includes the print driver:

generating, based upon the set of print settings specified for the particular electronic document, a print job ticket that indicates how the particular electronic document is to be printed on the particular printing device, transmitting the print job ticket to the particular printing device, and receiving, from the particular printing device, data that indicates whether a mismatch exists between a set of print settings specified for a particular electronic document to be printed and a set of print settings specified for a particular printing device on which the particular electronic document is to be printed.

20. A client device comprising:

a user interface configured to display information to users and receive user input from the users;

an application program that allows a user to generate an particular electronic document; and a print driver that corresponds to a particular printing device and is configured to:

generate a graphical user interface that allows a user to select a print settings mismatch tolerance level from a plurality of print settings mismatch tolerance levels, wherein each print settings mismatch tolerance level from the plurality of print settings mismatch tolerance levels has one or more corresponding actions that are performed in response to a mismatch between a set of print settings specified for an electronic document to be printed and a set of print settings specified for a printing device on which the particular electronic document is to be printed, wherein a first print settings mismatch tolerance level from the plurality of print settings mismatch tolerance levels has at least one corresponding action that is different than one or more actions that correspond to a second print settings mismatch tolerance level from the plurality of print settings mismatch tolerance levels;

detect, via the graphical user interface, a selection of a particular print settings mismatch tolerance level from the plurality of print settings mismatch tolerance levels, wherein the particular print settings mismatch tolerance level has one or more particular actions that correspond thereto;

after detecting, via the graphical user interface, the selection of the particular print settings mismatch tolerance level from the plurality of print settings mismatch tolerance levels, determine whether a mismatch exists between a set of print settings specified for a particular electronic document to be printed and a set of print settings specified for a particular printing device on which the particular electronic document is to be printed; and in response to determining that a mismatch exists between the set of print settings specified for the particular electronic document to be printed and the set of print settings specified for the particular printing device on which the particular electronic document is to be printed, the print driver performing one or more particular actions corresponding to the particular print settings mismatch tolerance level selected via the graphical user interface to address the mismatch between the set of print settings specified for the particular electronic document to be printed and the set of print settings specified for the particular printing device on which the particular electronic document is to be printed.

* * * * *